United States Patent [19]
Perkins

[11] 3,942,203
[45] Mar. 9, 1976

[54] SEGMENTED BUOY

[76] Inventor: Robert W. Perkins, Ocean Park Road, Old Orchard Beach, Maine 04064

[22] Filed: Apr. 3, 1974

[21] Appl. No.: 457,553

[52] U.S. Cl. .................................................. 9/8 R
[51] Int. Cl.² ......................................... B63B 21/52
[58] Field of Search ......... 9/8 R; 114/.5 F; 220/4 D, 220/9 F; 206/509

[56] References Cited
UNITED STATES PATENTS

| | | | |
|---|---|---|---|
| 2,518,323 | 8/1950 | Hunter | 9/8 R X |
| 3,001,564 | 9/1961 | Hopkins | 206/509 X |
| 3,132,417 | 5/1964 | Irwin | 9/8 R X |
| 3,144,016 | 8/1964 | Basci | 220/4 D X |
| 3,360,811 | 1/1968 | Bartlebaugh | 9/8 R |
| 3,408,669 | 11/1968 | Mott | 9/8 R |
| 3,427,973 | 2/1969 | Beers | 9/8 R X |
| 3,489,182 | 1/1970 | Cameron | 9/8 R X |
| 3,793,657 | 2/1974 | Kaas | 9/8 R |

Primary Examiner—George E. A. Halvosa
Attorney, Agent, or Firm—Pearson & Pearson

[57] ABSTRACT

An improved marker buoy having a body made of nesting segments wherein each segment has a cup-shaped lower portion filled with buoyant material and a hollow cylindrical upper portion with a cup-shaped cavity for nesting with the lower portion of a similar segment. The segments nest one within the other such that the outer wall of each cup-shaped portion reinforces the walls of the segment below it and the nesting segments are held together by a shaft passed longitudinally through the nesting segments with barbs protruding from the shaft for preventing the segments from slipping off the shaft. The segments nested one on top of the other define a cylindrical buoy, of horizontal striped pattern, standing erectly and visibly in the water by reason of a weighted, lower end on the shaft.

3 Claims, 8 Drawing Figures

SEGMENTED BUOY

BACKGROUND OF THE INVENTION

This invention relates to a segmented marker buoy for indicating the location of an object submerged in deep water. In particular, this buoy is useful for marking lobster traps or any other application where a highly visible and lightweight marker buoy would be of value.

One hazard to which buoys are continuously exposed is being dragged under water due to currents caused by tides, the activity of marine life, or other causes. A buoy must be sturdily constructed and designed to withstand the pressure which is exerted under water or it may be crushed, or filled with water or otherwise caused to lose its buoyancy. While on the surface, these buoys must also be rugged enough to withstand impact with passing ships.

In many areas, the buoys marking a fisherman's lobster traps must display a distinctive color pattern. In such cases, it is desirable to use a segmented buoy which may be easily assembled in a wide range of color patterns and sizes from a relatively small number of standard parts.

One technique which has been used in the past to construct segmented marker buoys is to bolt together several cylindrical buoyant sections to form a single cylindrical shape (see U.S. Pat. No. 2,716,758). It has also been proposed to make a marker buoy, or bobber, of alternate colored solid rings as in U.S. Pat. No. 3,408,669 to Mott of Nov. 5, 1968, or U.S. Pat. No. 3,161,982 to Lee of Dec. 22, 1964. All of the buoys of this type known in the prior art are composed of segments with essentially flat top and bottom faces which mount flush with the adjacent segments. In U.S. Pat. No. 3,626,528 to Jackson of Dec. 14, 1971 three hollow cups are assembled in a sleeve to form a float but the segments are not visible and one segment does not support, reinforce or even engage another segment.

SUMMARY OF THE INVENTION

An object of the invention is to provide an improved buoy and a novel process for making a segmented marker buoy.

Another object of the invention is to provide a buoy which can be readily assembled in a great variety of color identification patterns.

Other objects of the invention will be obvious to those skilled in the art on their reading this application.

The foregoing objects have been substantially accomplished by construction of a cylindrical marker buoy which is made up of any number of nesting segments. Each segment is made up of an impact-resistant, non-porous plastic shell with a cup shaped lower portion filled with a buoyant material and a hollow cylindrical upper portion having a cup-shaped cavity suitable for nesting with the lower portion of a similar segment. A hole passes through the center of the cup-shaped portion extending from the cavity of the cylindrical portion down through the bottom of the cup shaped segment. As shown in the drawings, the cup shaped lower portions and the cup shaped cavities in which they nest are substantially hemispherical in configuration.

The buoy can be assembled by nesting the cup-shaped bottom of one segment into the cup-shaped cavity in the cylindrical portion of another. A shaft which is conveniently weighted on one end is placed through the holes in the centers of segments with the weighted end of the shaft resting against the bottom segment and with barbs extending from the outside of the shaft to engage the segments and prevent them from slipping toward the other end of the shaft.

There are several advantages to this form of construction. Buoys of different color patterns may be easily constructed by simply using segments of different colors and nesting one on top of the other to produce a horizontally striped pattern. In addition, the cup-shaped bottom of each segment resting within a relatively thin-walled cavity of the segment below it, thereby reinforces the walls of that segment and reduces its susceptibility to crushing from excessive water pressure or to damage from impact with a passing ship. Also, in those situations where registration requirements do not dictate the size of the buoy, buoy length may be easily varied by adding additional segments in order to support differing weights and lengths of line leading down to objects in different depths of water.

The shaft passing through the middle of the segments with its protruding barbs provides an inexpensive method of assembling these buoys without the use of hand tools and the assembly may be performed at the site where the buoy is to be dropped.

In another embodiment of this invention each of the segments may be divided into multiple parts, i.e., quarters, with keys or keyways on the edges of each of the quarters so that the four quarters may be easily snapped together to form a completed segment. The advantage of this form of construction is that, if a longitudinally striped buoy is desired, then different colored quarters are snapped together and the same pattern is repeated for each of the segments. When such segments are nested together the effect will be to provide longitudinal stripes of different colors running the length of the buoy. This construction retains all of the structural advantages previously recited.

ILLUSTRATIVE EMBODIMENT OF THE INVENTION

In this application and accompanying drawings, there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

IN THE DRAWINGS

Figures 1, 2, 3, 4, 5:
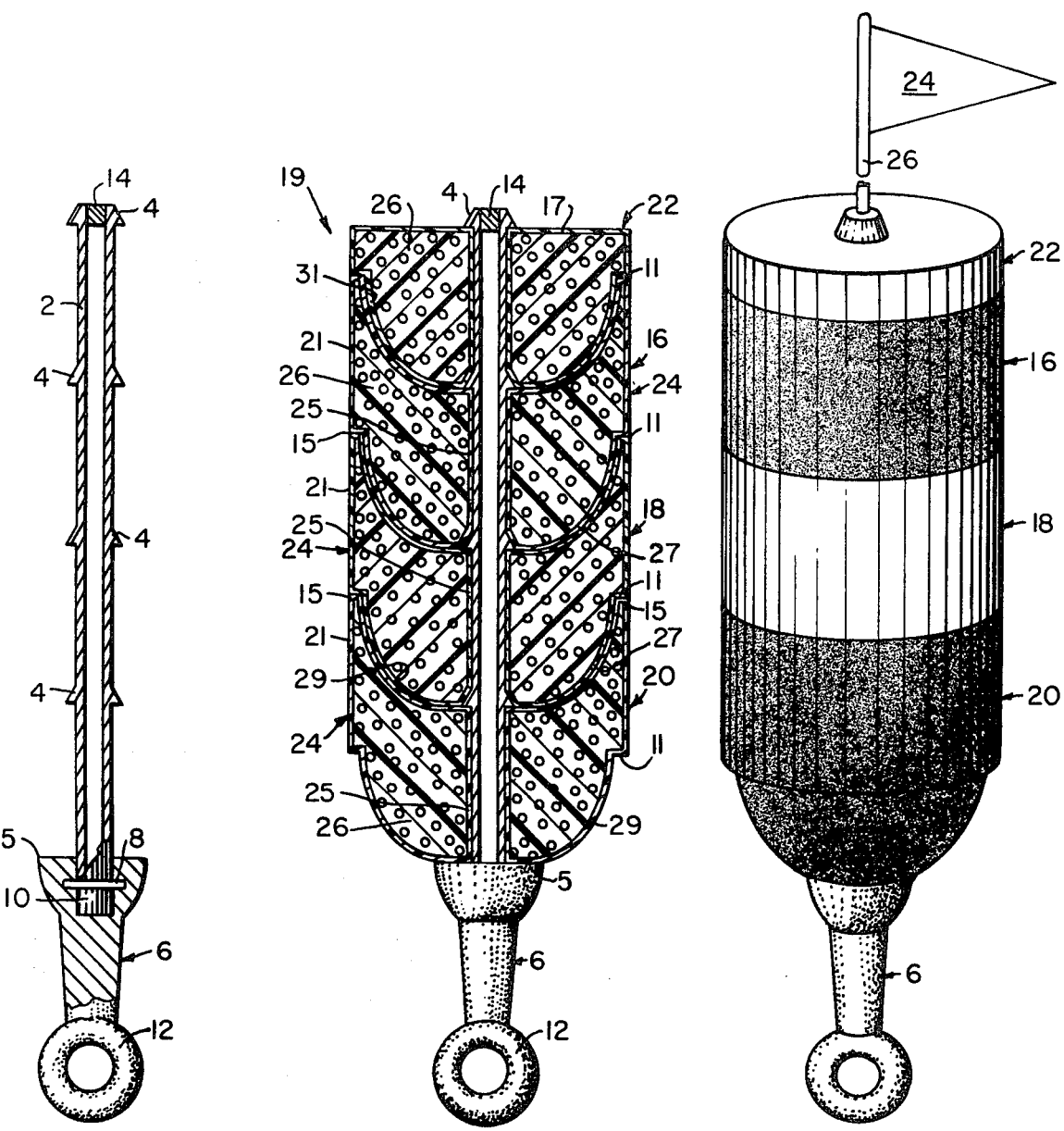
FIG. 1 is a cross-sectional view of the weighted center support.
FIG. 2 is a cross-sectional view of the assembled marker buoy.
FIG. 3 is a perspective view of an assembled horizontally striped buoy.
FIG. 4 is a view of the top piece insert.
FIG. 5 is a cut-away view of a segment.

FIG. 1 shows a typical buoy center support comprising shaft 2 with projecting barbs 4 and weighted nose piece 6. Shaft 2 is secured to the nose piece by ring 8 which fits groove 10 in the shaft. The nose piece is formed around the ring and shaft end. Nose piece 6 may be made of reinforced ferro cement or other dense material which will keep this end of the shaft down in the water when the center of buoyancy of the buoy is located somewhere along shaft 2. The shaft is hollow and may be made of any non-corrosive, lightweight, strong material. Eye 12 is formed in nose piece 6 so that a line may be secured to the buoy. Plug 14 is placed in the end of the shaft to prevent water from filling the hollow shaft and thereby reducing the overall buoyancy of the buoy.

FIG. 2 shows an assembled buoy made up of three nested cup-shaped segments 16, 18, 20 and top piece 22. Segments 16, 18 and 20 each comprise a cup-shaped lower portion 29 formed of unicellular buoyant material 26, such as styrofoam, and a hollow cylindrical upper portion 21 having a cup-shaped cavity 27 suitable for nesting with the lower portion of a similar segment. Although the upper portions are shown as being cylindrical, they may be of any shape. The walls 24 of each segment are made of a thin layer of rigid, impact-resistant, non-porous, non-corrosive material, such as polyethylene. These segments may be blow molded or formed in any other suitable manner. Opening 25 passes from the bottom of the cup-shaped portion, through the center of each segment and to the bottom of cavity 27. A shoulder 11 in each annular flotation member 16, 18 or 20 seats the peripheral rim 15 of the next successive member.

Top piece 22 has a cup-shaped lower portion 31 identical in shape to that of segments 16, 18 and 20 and has a cylindrical upper portion 19 filled with a buoyant material 26. The cylindrical portion is thinner than the hollow cylindrical portions of the segments and produces a flat top surface 17 to the top piece. The top piece may be made of identical material as the other segments. For greater clarity, FIGS. 4 and 5 show a perspective view of top piece 22 and a cut-away view of segment 16, respectively.

The buoy is assembled by placing shaft 2 through the center hole 25 of each of the segments. The bottom segment 20 will engage collar 5 of end piece 6. The collar must be sufficiently large not to fit through opening 25 and thereby provides a stop for the segments at the bottom of shaft 2. Segment 20 is placed firmly against collar 5 causing bottom barb 4 to engage the surface of cavity 27. The barb acts as a stop preventing segment 20 from moving off the top end of shaft 2. Thus the bottom segment is locked in place between bottom piece 6 and the bottom barb 4.

Shaft 2 is next placed through the opening in segment 18. The cup-shaped portion of segment 18 is placed firmly against the cup-shaped cavity of segment 20. The cavity is shaped to receive the cup-shaped lower portion of segment 18 such that is presses evenly over the entire surface of the cavity. Top edge 15 of segment 20 contacts bottom surface 11 of the cylindrical portion of segment 18 when the two segments nest together. Center barb 4 presses against the cavity surface of segment 18 and prevents it from moving toward the top end of the shaft. Thus segment 18 locks in place between lower segment 20 and middle barb 4.

In this manner, a buoy comprising any numbers of segments may be constructed, limited only by the length of shaft 2, which can be of any length.

After a suitable number of segments have been joined, i.e., three segments in the example shown in FIG. 2, shaft 2 is placed through the center opening 23 of top piece 22. The top piece engages the segment below it in the same manner that segment 18 engages segment 20 as described above. Also similarly, top barb 4 engages top surface 17 of top piece 22 and thereby locks the top piece in place between the barb and adjacent segment 16. The use of top piece 22 at the top of the buoy prevents water from filling the top segment and freezing, thereby cracking the buoy by the force of the expanding ice.

A unique feature of this invention is that the rounded bottom shape of each segment is used to support the cylindrical walls of an adjacent segment. It is well known that curved surfaces distribute applied pressures more evenly over their entire surface area than do flat surfaces. For this reason, a minimum thickness of rigid structural material is required to give each of the mutually reinforcing segments enough strength to avoid being crushed by water pressure or impact with passing ships. Thus, by minimizing the quantity of high density material required it is possible to fill a large percentage of the buoy with buoyant material and thereby reduce the buoy volume required to support a given length of line. A lighter buoy will also stand more erectly and more visibly in the water for a given weight of nose piece and is easier to handle by the lobstermen who must continually haul the buoy and its line from the water.

FIG. 3 shows an example of an assembled horizontally striped buoy representing one embodiment of this invention. Segments 16 and 20 are shown colored to contrast with segment 18. As stated previously, the assembled buoy may be of any number of segments up to the length of shaft 2, in order to support different lengths and weights of line. Pennant 24 and mast 26 are shown extending from the top of the buoy to provide an additional highly visible means for identifying the buoy.

Figure 6:
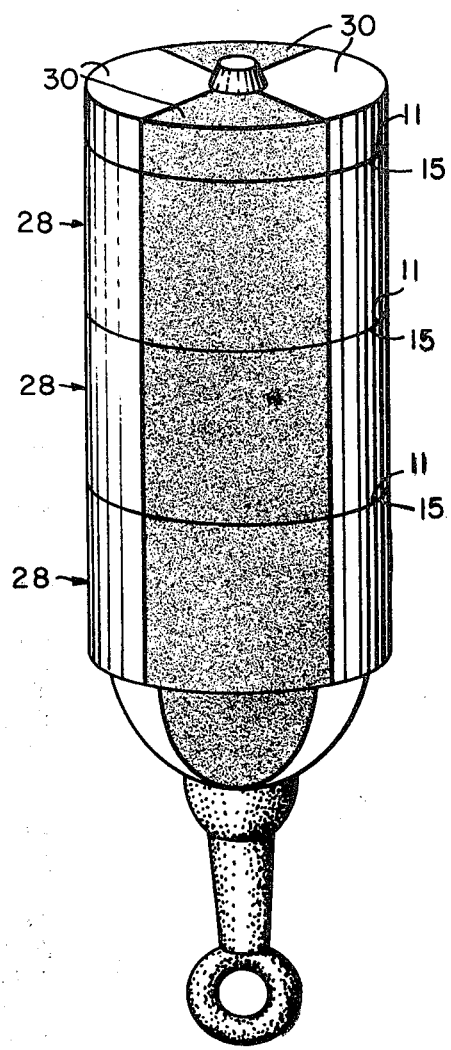
FIG. 6 is a view of an assembled vertically striped buoy.
Figure 7:
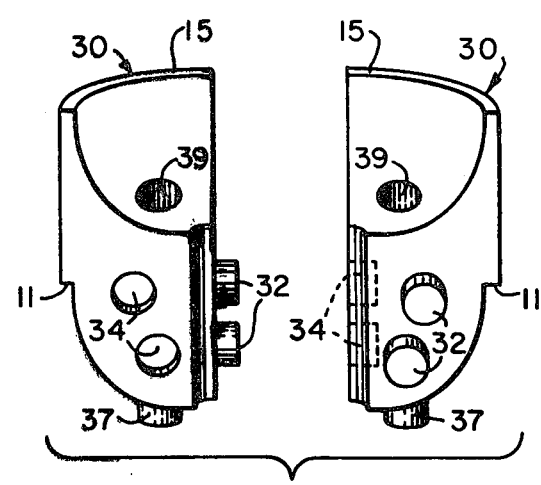
FIG. 7 is a side view of two quarter segments.
Figure 8:
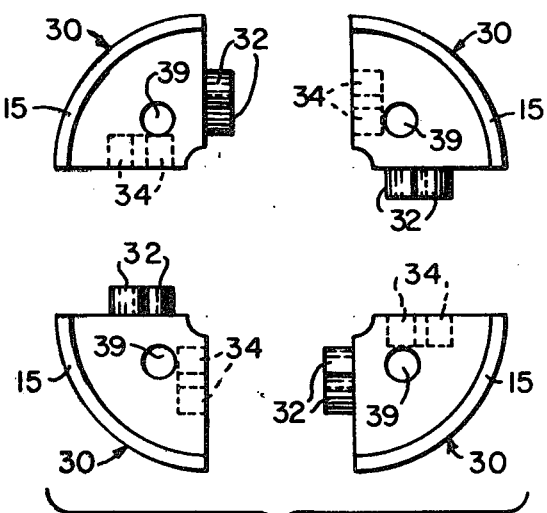
FIG. 8 is a top view of four quarter segments.

Another embodiment of this device is shown in FIG. 6, which is identical to that shown in FIG. 3 except that each of the segments 28 is divided into four quarters 30. Each of the quarters are constructed of similar material to the segments 16, 18 and 20 previously described. FIG. 7 shows keys 32 or keyways 34 on different sides of the four quarters which enable them to securely mate together to form a single cup-shaped segment. FIG. 8 shows four quarter segments aligned for assembly.

Each of the quarter segments may be selected to be of a different color. In those situations where it is desirable to have colored stripes running laterally along the length of the buoy, as shown in FIG. 6, it can be seen that it would be a simple matter to form each complete segment from quarters of different colors and align similar colors one on top of the other when the segments are joined together to form the complete buoy. Keys 37 and keyways 39 are shown in FIG. 7 in the bottom and top of each quarter segment and will keep the assembled segments in proper vertical alignment so that the vertical color patterns will remain aligned.

Thus, standard segments can be purchased and snapped together to form custom buoys. In this matter, one standard product design would be suitable to serve the entire lobster fishing industry where each lobsterman must have his own distinctively designed lobster buoy.

It is also understood that the following claims are intended to cover all of the generic and specific features of the invention herein described and all statements of the scope of the invention which might be said to fall therebetween.

I claim:

1. In a marker buoy of the type having an elongated central rod with a plurality of individual annular flotation members of predetermined diameter sleeved thereon, the combination of:

a plurality of said members, each having a substantially hemispherical lower portion of reduced diameter extending axially at the bottom of each said member and a correspondingly shaped upper cavity in the top of each said member, the lower portion of one member fitting within the upper cavity of the next successive lower member;

said members thereby nesting one on top of the other and mutually defining a cylindrical body;

said reduced diameter lower portion being separated from the main body of said members by a shoulder against which the peripheral rim of the next successive member is seated;

and a weighted nose piece at the lower end of said central rod, resting against the bottom said member for causing said buoy to stand erectly in the water;

said elongated central rod being hollow with a hollow upper end containing a plug and the weighted nose piece at the lower end thereof having an eye for receiving a line.

2. A combination as specified in claim 1, wherein:

said hollow central shaft includes a cylindrical wall having integral barbs spaced therealong and projecting radially therefrom and each said segment includes a thin wall of rigid, impact resistant, non porous non corrosive material into which said barbs are penetrated to retain said segments on said shaft.

3. A combination as specified in claim 1 wherein:

each of said segments is formed of foam plastic covered with a thick tough plastic skin;

each of said segments is divided into four quarter sections, and said sections are detachably, slidably connected to each other by keys and key-ways extending horizontally and vertically therefrom, said keys and key-ways being integrally formed in the plastic skin of said segments.

* * * * *